J. C. McNUTT & A. B. FURMAN,

Assignors to J. Oliver.

PLOW.

No. 7,732. Reissued June 12, 1877.

WITNESSES

Edw. S. Nottingham

F. D. McKeever

INVENTORS

J. C. McNutt.

A. B. Furman.

By Leggett and Leggett.

ATTORNEYS

N. PETERS, PHOTO-LITHOGRAPHER, WASHINGTON, D. C.

UNITED STATES PATENT OFFICE.

JAMES C. McNUTT, OF BLAIRSVILLE, AND ALONZO B. FURMAN, OF STRATTONVILLE, PA., ASSIGNORS, BY MESNE ASSIGNMENTS, TO JAMES OLIVER.

IMPROVEMENT IN PLOWS.

Specification forming part of Letters Patent No. 95,251, dated September 28, 1869; reissue No. 7,732, dated June 12, 1877; application filed December 4, 1876.

*To all whom it may concern:*

Be it known that we, J. C. McNUTT, of Blairsville, Indiana county; and A. B. FURMAN, of Strattonville, in the county of Clarion and State of Pennsylvania, have invented a new and useful Improvement in Plows; and we do hereby declare the following to be a full, clear, and exact description thereof, which will enable others skilled in the art to make and use the same, reference being had to the accompanying drawings forming a part of this specification.

Our invention relates to improvement in plows.

Figure 1:
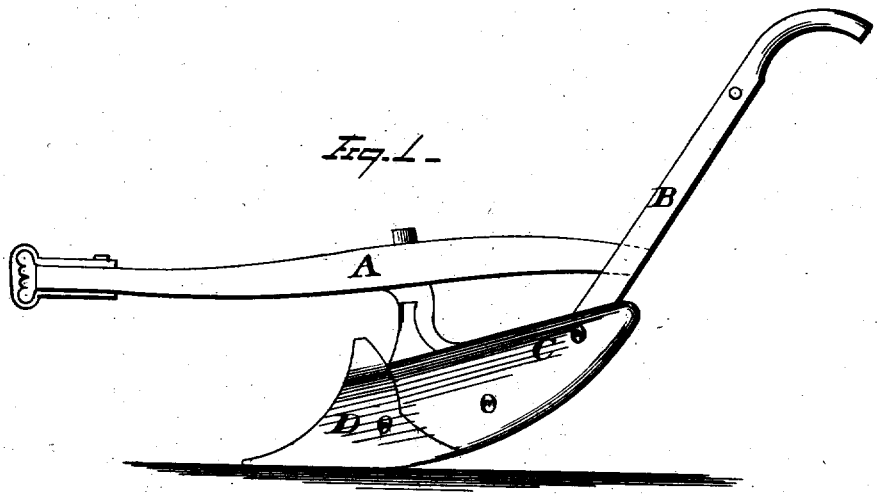
Figure 2:
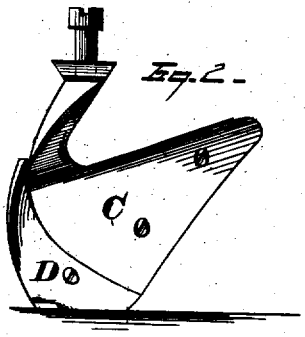
Figure 3:
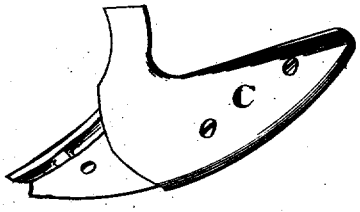

In the drawing, Figure 1 is a side view of our improved plow; Fig. 2, a front view of the same; Fig. 3, a detached view of the mold-board with the colter and point removed.

Our invention consists of the following parts, constructions, and combinations, as hereinafter specified and claimed, wherein A represents the beam; B, the handle of the plow; C, the mold-board, which may be secured to the beam in any suitable manner. D is the colter and point.

It will be noticed that the plow is provided with a removable shoe or false land-side, so that this part may be readily detached and be replaced when worn or damaged.

The point D is constructed to fit into the seat or recess upon the front edge of the mold-board and land-side, and is given such a shape as that the colter and plow-point shall have the same curve, or nearly the same, as the mold-board of the plow to which it is to be attached, so that, when joined together, there shall be a uniform surface, that may be ground over and polished, and present, in operation, a continuous surface. It will also be noticed that the land-side and colter or cutting-edge of the point, land-side, and mold-board are formed upon an incline, as shown in Fig. 2, so as to cut the land side of the furrow upon such an incline. By this construction, as the furrow-slice is cut and raised by the plow it rests upon its inner edge, so that it will overbalance even before it reaches a perpendicular position, thus making the draft light.

This construction of the plow also causes the furrow-slice, when turned, to overlap the preceding furrow-slice, leaving an air passage or channel along the under side of each furrow-slice, causing the sod to rot more quickly and make the harrowing more effective in pulverizing the soil.

Near the upper edge of the part of the mold-board C that is covered by the point D is formed a groove, $c'$, to receive a steel bar, the forward end of which is designed to project, to serve as a point in plowing hard or gravelly soil. The groove $c'$ should be formed of one or more ribs, to enter a recess or recesses in said bar to prevent longitudinal movement.

What we claim is—

1. A colter and plow-point made in one piece, the same having a curve like or nearly like unto that of the mold-board of the plow to which it is attached, substantially as and for the purpose described.

2. A plow the colter-point and mold-board of which are given the same or nearly the same curve, substantially as and for the purpose shown.

3. The groove $c'$ formed in the part of the mold-board that is covered with a plow-point and colter, substantially as and for the purpose described.

JAMES C. McNUTT.
ALONZO B. FURMAN.

Witnesses:
W. A. FALCONER,
GEO. R. WALKER,
J. R. EMERY,
R. H. WALKER.